United States Patent [19]

Wilman

[11] Patent Number: 4,565,485
[45] Date of Patent: Jan. 21, 1986

[54] MECHANICAL GRAB AND SCOOP COMBINATION

[76] Inventor: Thomas S. Wilman, Mews Cottage, 5 Horsemarket, Kirkby Lonsdale, Carnforth, England, LA6 2AS

[21] Appl. No.: 642,669
[22] PCT Filed: Dec. 19, 1983
[86] PCT No.: PCT/GB83/00337
    § 371 Date: Aug. 15, 1984
    § 102(e) Date: Aug. 15, 1984
[87] PCT Pub. No.: WO84/02543
    PCT Pub. Date: Jul. 5, 1984

[30] Foreign Application Priority Data

Dec. 21, 1983 [GB] United Kingdom ................ 8236338

[51] Int. Cl.⁴ ............................................. E02F 3/00
[52] U.S. Cl. ................................. 414/704; 414/726; 414/740; 37/DIG. 3
[58] Field of Search ............... 414/785, 740, 739, 738, 414/704, 703, 721, 726, 722; 37/DIG. 3, DIG. 12, 117.5

[56] References Cited

U.S. PATENT DOCUMENTS

| 842,417 | 1/1907 | Nelson | 414/740 |
|---|---|---|---|
| 2,418,251 | 4/1947 | Drott | 414/739 X |
| 2,717,704 | 9/1955 | Pilch | 414/739 X |
| 2,848,125 | 8/1958 | Irvine | 414/740 X |
| 2,870,925 | 1/1959 | Bernad et al. | 414/740 X |
| 3,209,474 | 10/1965 | Artman | 37/117.5 |
| 3,235,108 | 2/1966 | Drakulich | 414/785 X |
| 3,362,554 | 1/1968 | Fortier | 214/766 |
| 3,375,595 | 4/1968 | Beltrami | 37/117.5 |
| 3,455,477 | 7/1969 | Blair | 414/704 |
| 3,700,131 | 10/1972 | Westendorf | 414/704 |
| 3,817,567 | 6/1974 | Lull | 414/740 X |

FOREIGN PATENT DOCUMENTS

| 777628 | 2/1968 | Canada . | |
|---|---|---|---|
| 785111 | 5/1968 | Canada . | |
| 3031948 | 8/1980 | Fed. Rep. of Germany . | |
| 1286478 | 1/1962 | France . | |
| 1369084 | 6/1964 | France . | |
| 2224398 | 10/1974 | France | 414/739 |
| 753967 | 1/1965 | United Kingdom . | |
| 1095250 | 12/1967 | United Kingdom . | |
| 1536937 | 12/1978 | United Kingdom . | |
| 2027669 | 2/1980 | United Kingdom . | |
| 2048654 | 3/1980 | United Kingdom . | |

OTHER PUBLICATIONS

Canadian Patent 942,714, Feb. 24, 1974.
Bobcat 2000—Clark Bobcat Brochure, Printed in Belgium, possibly in 1982.

Primary Examiner—Clifford D. Crowder
Attorney, Agent, or Firm—Polster, Polster and Lucchesi

[57] ABSTRACT

The grab (3) for handling material has two grab members (4, 5) one or both or which have tines (6, 7), the grab members being relatively movable to open or close the grab so that cohesive or rigid material can be grasped between the tines (6, 7). Additionally, one grab member (4) has side and bottom panels (21, 22) forming a scoop or bucket component and the other grab member (5) has a back panel (10) so that in one condition of the grab, e.g. when the grab members (4, 5) are closed, there is formed a complete scoop or bucket for scooping up granular or liquid material to be handled.

In another embodiment, the grab member (5) may also have small side and bottom panels; in other examples the scoop may be provided wholly on one of the grab members.

The grab avoids having to use separate devices respectively for grasping and for scooping operations. It is particularly suitable for mounting on a tractor vehicle, though the combined grab and scoop facility is applicable also to implements, utensils, tools or other apparatus, large or small, for materials handling.

8 Claims, 22 Drawing Figures

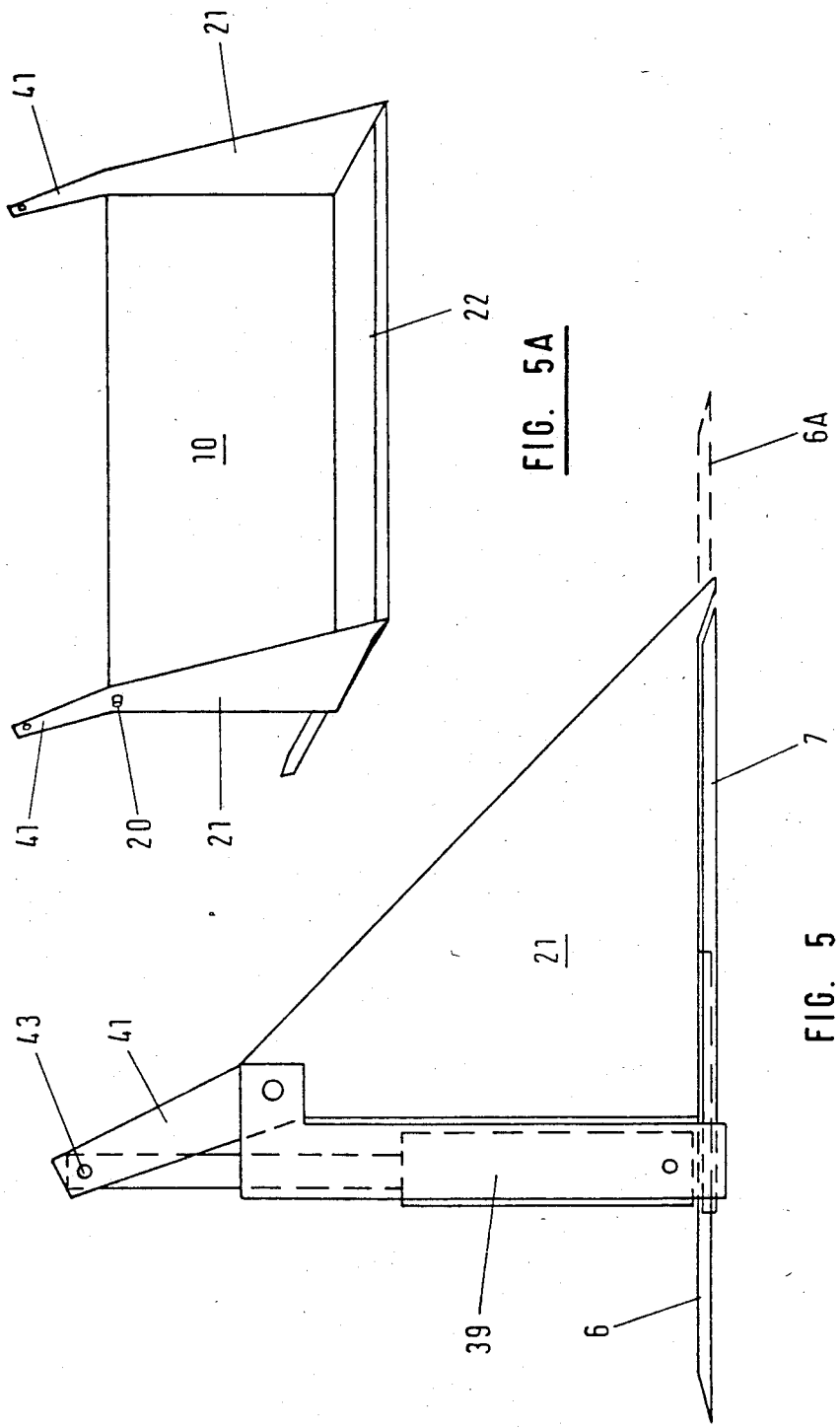

MECHANICAL GRAB AND SCOOP COMBINATION

This invention relates to a versatile material handling device for use on a vehicle, which device is capable of acting both as a grab and as a scoop or bucket loader. When acting as a grab, the grab members provided with tines, can be closed together or opened, like jaws, to hold or release cohesive or solid material, such as bundles, or relatively large solid or rigid items, which can be handled by fork-like tines. When acting as a scoop or bucket loader, it is capable of handling loose material such as soil, sand or slurry.

The invention is particularly, although not exclusively applicable to an agricultural loader for loading for example grass, silage, timber or large cartons or containers, and which may be mounted on the front of a tractor; however, the invention may also find use in a wide variety of different applications from small implements up to large industrial materials handling equipment or machines.

A known silage grab comprises two grab members of which one, termed a fork member, has a solid rectangular flat back-plate with fork tines projecting forwardly from its lower edge and generally at right angles to it; the other member, termed the top grab, has a rectangular frame top from one side edge of which extend tines generally downwardly, and there may also be tines extending down from the end edges of the frame so that the frame and the tines along the side and at each end form half a cage.

The two members are mounted so that they can be pivoted together in a closed position forming a complete cage with the tips of the fork tines and top grab tines almost touching.

When mounted on the front hydraulically-operated arms of a tractor, such a silage grab can be used for grabbing silage or grass or even timber, and lifting and moving it, the material being released by opening the grab members after having pivoted the two members jointly if necessary so that as they open the material falls out from between them.

Such a grab has its limitations. It cannot be used for granular material like animal feed cake or grain because the small pieces fall out between the tines. Nor could it be used for moving particulate material like sand or soil nor liquid or semi-liquid/solid material like slurries. If the tines are placed nearer together or replaced by solid walls, then the grab becomes cumbersome and it would then be difficult to get the tines or walls to penetrate deep into silage. it is usually necessary therefore for farmers to have other types of equipment for handling such other materials.

It has been proposed in U.S. Pat. No. 3,455,477 and U.K. patent specification No. 1 536 937 to convert such a grab for use as a bucket loader by attaching, for example by bolting, web plates to the fork member so that the fork tines are masked and the spaces between the tines are covered, and by attaching side plates so that a scoop is provided. When a bucket loading operation is completed and the device is once again required for use as a silage grab, the plates have to be removed.

It will be appreciated that such attachment and removal of these plates is a time consuming and dirty operation and furthermore the web plates when not in use have to be stored and may therefore not be readily to hand when immediately required.

A principal object of the invention is to provide a more versatile material handling apparatus of the mechanical grab type which can act either as a silage grab or as a bucket loader without additional or supplementary components having to be fitted or removed when changing from one type of use to the other.

Another object is to provide a device which can be used selectively, at will, either as a grab or as a bucket loader entirely under remote control by an operator, from a vehicle to which the device is fitted.

Another object is to provide a device which can be used as a grab or as a bucket loader merely by changing the relative position of the grab members.

According to the present invention there is provided a material handling device for use on a vehicle, which device is capable of acting both as a grab and as a scoop without having additional components fitted and removed, comprising a fork member consisting of a set of tines held on a support structure so that, in use, the tines project forwardly away from the vehicle, and a grab member having a further set of tines projecting therefrom; wherein:

(a) the grab member is pivotally mounted relative to the fork member to close and open the fork and grab members thereby to bring the sets of tines towards and away from each other so that they can grasp and accommodate material between them when partially together;

(b) the tines of the two sets are offset from each other laterally relative to the opening and closing movement so that the fork and grab members can be closed right up, with the tines of one set fitting between the tines of the other set; and (c) at least the grab member is provided with a fixed sheet structure which affords a scoop component such that when the fork and grab members are closed fully together a material scoop is formed, part of the scoop component on the grab member overlying the set of tines on the fork member.

In one form of the invention, the scoop or bucket is provided wholly on the grab member, the scoop or bucket facing away from the tines on the grab member, i.e. away from the fork member.

The scoop or bucket on the grab member may comprise side and bottom scoop panels, and a back panel or a back frame such as bars which serve to retain material in the grab. If a back frame of bars or struts is provided, these may advantageolusly take the form of gussets in the scoop or bucket which strengthen the bottom panel of the latter.

In another form of the invention, the scoop or bucket is constituted by sheet structure portions of both the grab member and fork member, the complete scoop or bucket being formed when the fork and grab members are closed fully together. Thus, the grab member may have sides and/or a bottom panel but no back panel, or merely a back frame, so that the scoop or bucket component on the grab member is open at the back; and the fork members may have a back panel only or a back panel and sides and/or a bottom panel, so that when the fork and grab members are fully closed, the sides and bottom scoop panels on the grab member abut or overlap along their back edges against the back panel portion or against the side and/or bottom panels of the fork member thereby to form the complete scoop.

The sets of tine provided on the fork and grab members may each be arranged in a straight row, and in this case the scoop or bucket structure is conveniently formed by a bottom panel aligned with the row of tines and side panels disposed at each end of the row of tines and arranged perpendicularly to the bottom panel.

The bottom and side panels may conveniently constitute the support structure for the tines, the tines being mounted on the bottom panel.

Owing to the fact that the tines of the two sets are slightly offset from each other laterally relative to the grab opening and closing movement, the fork and grab members may be closed completely together with the tines completely interengaged, the tines of the grab member extending beyond the back of the fork member.

The fork and grab members may be opened and closed by pivotal movement of one of them relative to the other; preferably the grab member with the scoop or bucket component on it is the one which is arranged to pivot for opening and closing the grab, conveniently on a pivot provided on the support structure of the grab member.

The fork member is then conveniently adapted to be carried by means of a pivotal connection which enables the whole device to be pivoted bodily about a generally horizontal axis parallel to the opening and closing pivotal axis, at the free end of one or more arms such as the front loader arms of a tractor which can be swung up or down to lift or lower the device.

The opening and closing of the device may be effected by a hydraulic ram or other drive means provided for that purpose acting through a mechanical linkage connected to the pivoting grab member or acting directly on the pivoting grab member for example on an extension of the support structure extending beyond its pivot.

The scoop or bucket is provided on the grab member which is farther from the loader arms (and tractor) so that the scoop faces forwards with its open front when the device is closed. The tractor can then be used, in this mode, as an ordinary forward-operating scoop or bucket loader.

The pivot of the pivoting grab member with the scoop on it, is preferably located relative to the support structure of the fork member so that the grab can be opened right out with the pivoting grab member pivoted by up to 180° or more from the fork member which can then be used alone as a plain fork-lift device.

In other embodiments, the fork and grab member may be opened and closed by some other mechanical arrangement, such as a sliding arrangement in which one or both members move on slides; a scissor-type of arrangement, this being a variant of the pivotal connection though with the pivot point spaced farther from the fork and grab members; or a spring tongs arrangement.

The invention may be put into practice in many ways but certain specific embodiments will now be described by way of example with reference to the accompanying drawings, in which:

FIGS. 5, 5A and 6 are views of a further embodiment of a grab and bucket loader with a different operating arrangement, shown in the closed and open positions respectively;

Figure 1:
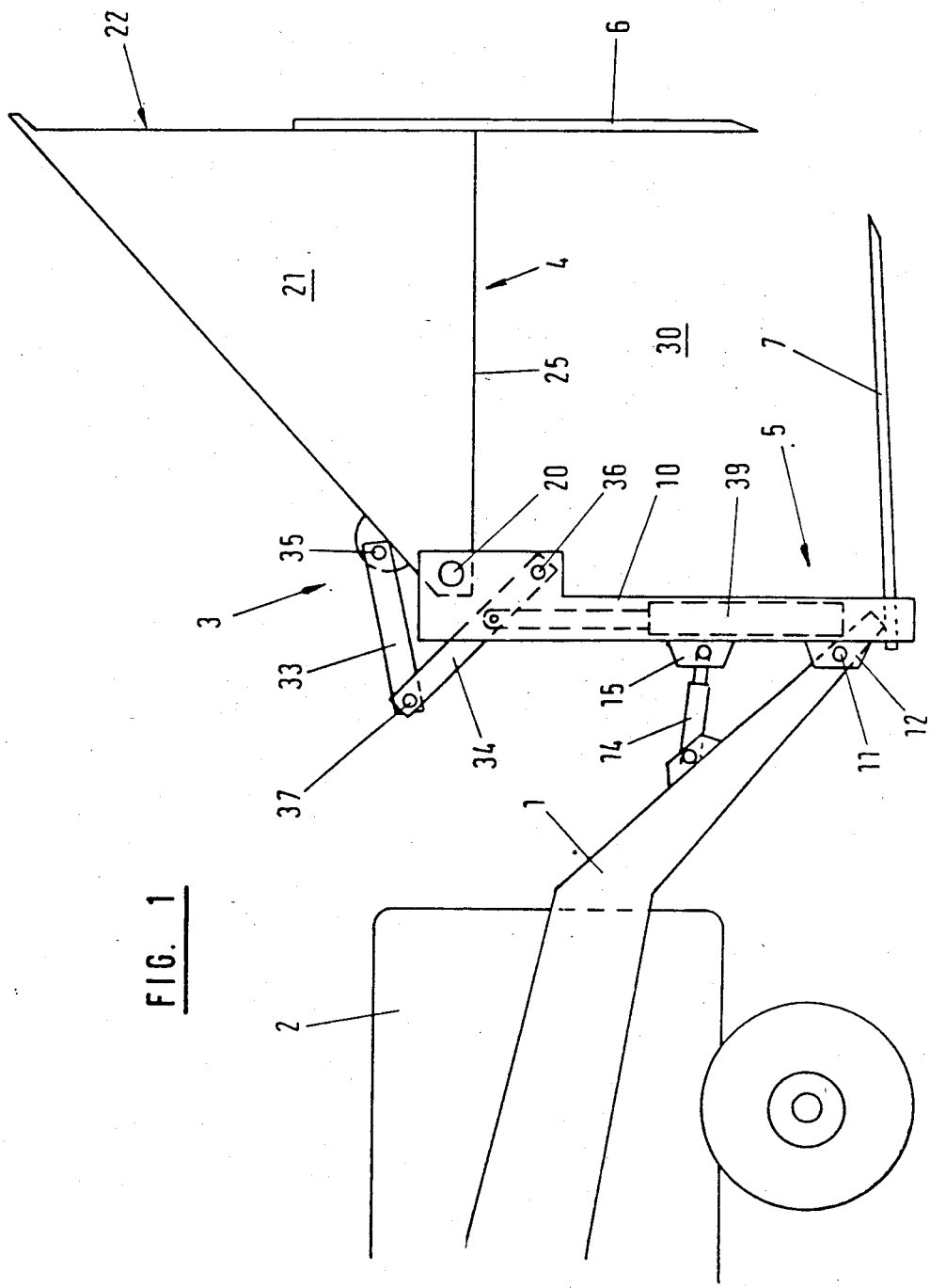
FIG. 1 is a side view of an agricultural grab and bucket loader, in accordance with the invention.

The mechanical grab and bucket loader shown in FIGS. 1 to 4 is intended particularly for agricultural use and it is thus shown mounted at the free ends of the two front loader arms 1 of a tractor 2.

The grab unit, indicated as a whole by reference 3, comprises generally a grab member 4 and a fork member 5 which can be opened and closed like jaws each member having a respective set of tines 6 and 7. The fork member 5 is L-shaped, the tines 7 projecting straight and forwardly from the lower edge of a back plate 10 which thus forms a support for the tines which are removably attached to it to facilitate replacement.

The grab 3 is connected to the loader arms 1 by means of a pivotal connection 11 and a lug 12 formed on the back of the back plate 10 of the fork member 5. A hydraulic ram 14 operates between a further lug 15 on the back plate 10 and the arms 1 by means of which the whole grab 3 can be tilted bodily about the horizontal axis of the pivot 11.

The grab member 4 is pivotally connected to the fork member 5 by a pivot 20 located in an enlargement at the top of the back plate 10 and slightly forward of the plate. The grab member 4 thus can be swung clockwise or anticlockwise about the pivot 20 relative to the fork member 5 from its position shown in FIG. 1 to close or open the grab as shown respectively in FIGS. 2 and 3.

Figure 4A:
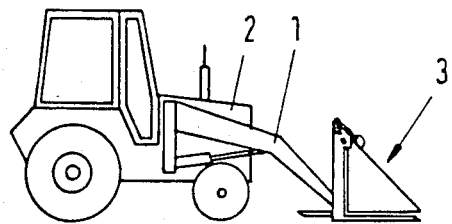
FIGS. 4A to 4J are views illustrating different operating positions of the apparatus of FIGS. 1 to 3 in use on a tractor.
Figure 4B:
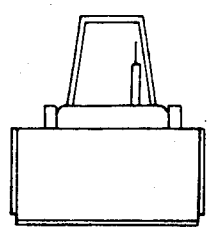
Figure 4C:
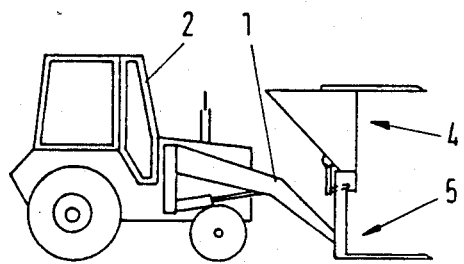
Figure 4D:
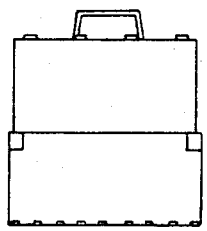
Figure 4E:
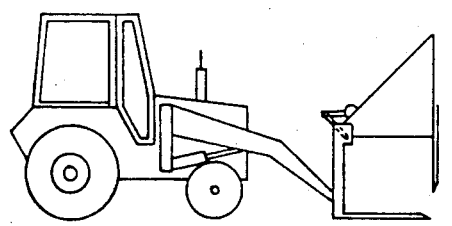
Figure 4F:
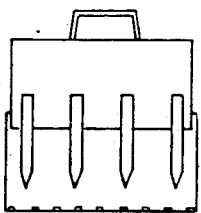
Figure 4G:
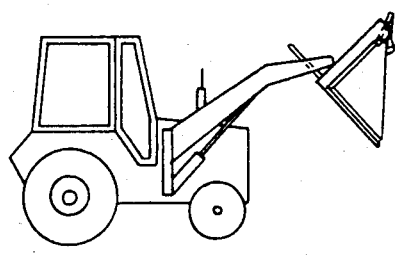
Figure 4H:
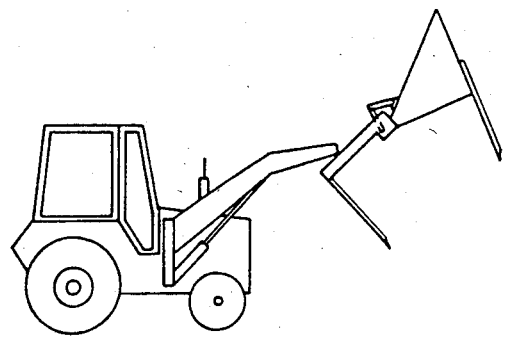
Figure 4I:
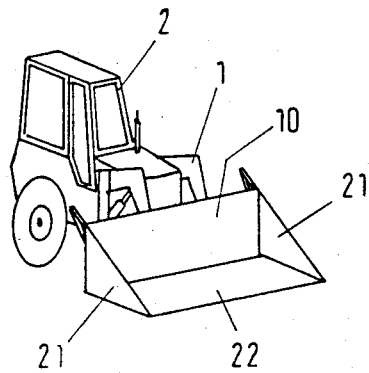
Figure 4J:
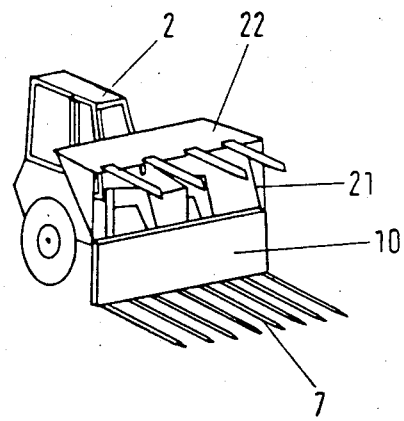

The grab member 4 comprises two triangular side walls or panels 21, in one corner of which is located the pivot 20, and a bottom wall or panel 22 extending between the edges of the side walls 21 which lie opposite the pivot 20 (see FIG. 4I). The tines 6 which are straight, but may in other embodiments be slightly curved or include a bend, are removably attached to the bottom panel 22 which together with the side walls 21 thus constitute the support structure for the tines 6 of the grab member 4. The side and bottom panels 21 and 22 define together an open fronted scoop or bucket component facing away from the fork member 5. It is also open at the back between the edges 25 of the side walls 21 though in other embodiments there may be a solid back panel or an open frame structure such as bars, as will be explained.

The individual tines 6 are slightly offset laterally relative to the tines 7 so that as the grab 3 is closed the tips of the tines 6 pass between adjacent tines 7. This enables the grab member 4 to be pivoted right up to the fork member 5 to the fully closed position shown in FIG. 2 with the tines 6 engaged completely between the tines 7 and projecting in the backward direction beyond the bottom of the back plate 10, and with the tines 7 projecting under the bottom wall 22 of the scoop component on the grab member 4. Moreover, the back edges 25 of the side walls 21 and the corresponding back edge of the bottom wall 22 come up to or overlap the back plate 10 of the fork member 4 so that that back plate 10 then forms a back panel of the scoop or bucket, as shown clearly in FIG. 4I. The back panel 10 need not be solid; it could consist merely of bars or a frame.

In this fully closed position of the grab 3 there is thus formed a forward facing scoop or bucket which can be used as a normal forward-operating scoop of the loader for shifting granular or particulate material or semi-liquid slurries. The bucket can be lifted by lifting the arms 1 of the tractor 2 and tipped up or down by operation of the ram 14. The back edges 25 of the side walls 21 and the back edge of the bottom wall 22 could be arranged to mate in a sealed manner with the back plate 10 so that even liquids could be held in the scoop provided the front edge was tilted up.

For shifting grass, silage or other material like timber which is better engaged by tines rather than a bucket-scoop, the grab 3 is operated as a normal tined grab with the grab and fork members 4 and 5 partially open by pivoting the top grab member 4 away from and towards the lower grab member 5, the material being grasped in the cage-shaped space 30 (see FIG. 1) between the tines 6 and 7.

Figure 3:
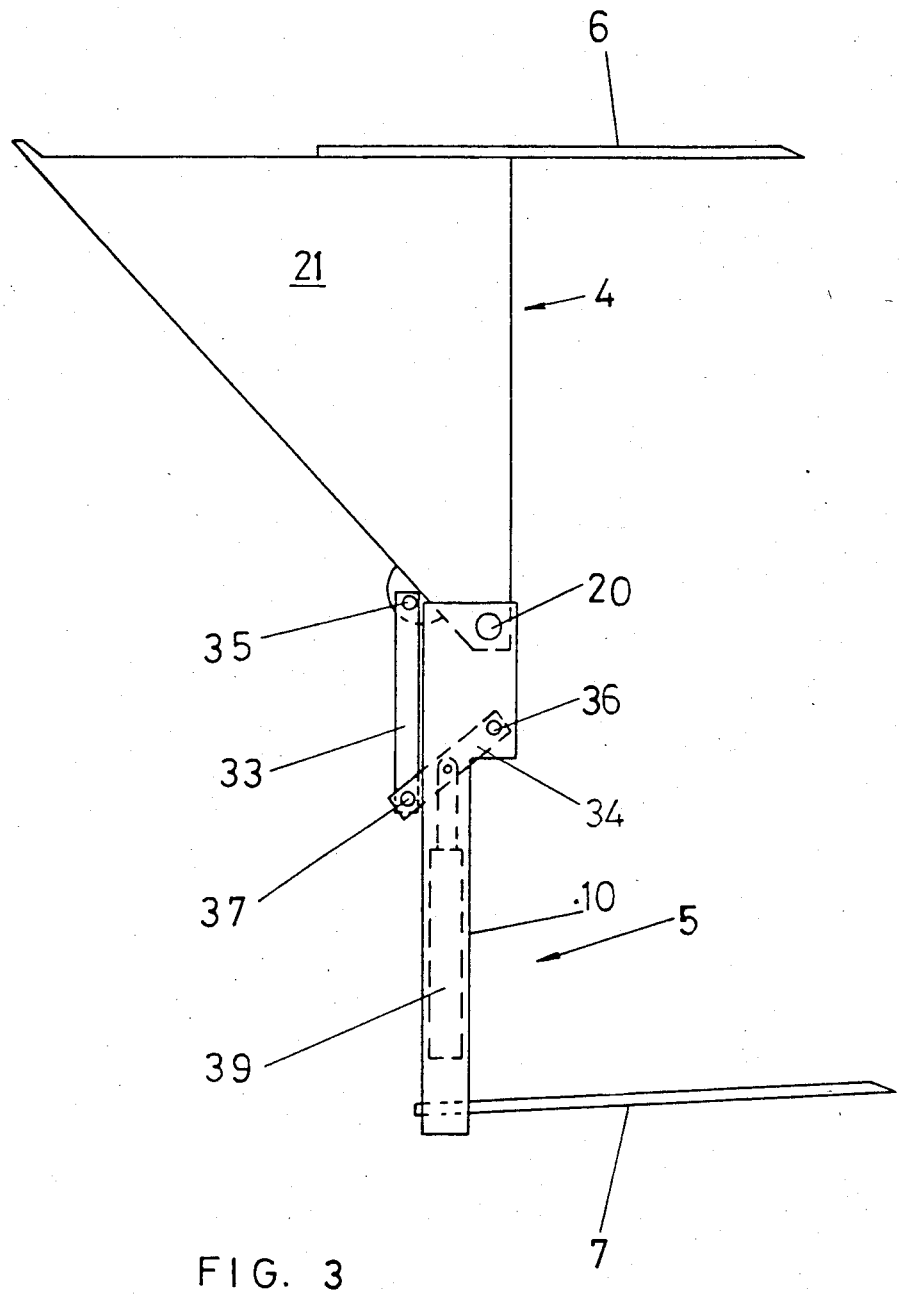

If the grab member 4 is pivoted right away from the fork member 5 as shown in FIG. 3, the latter may well be used by itself as a simple fork-lift device.

Figure 2:
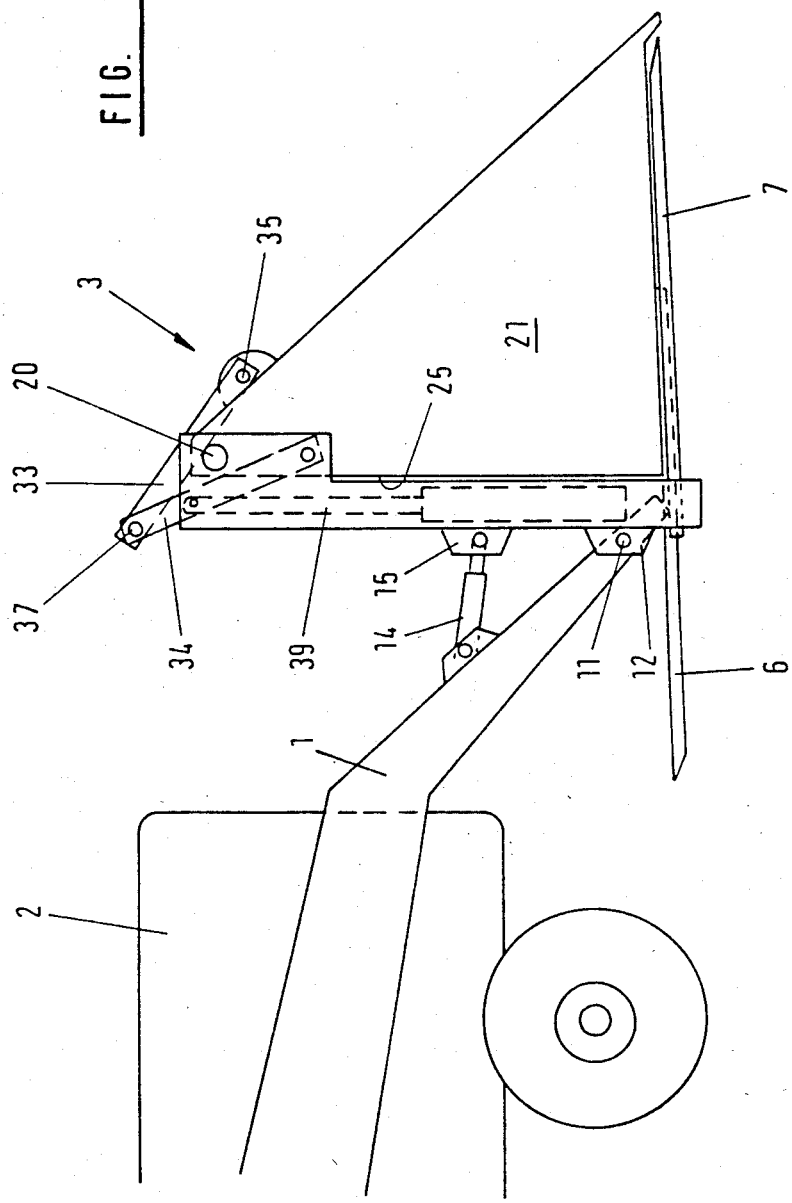
FIGS. 2 and 3 are similar views to FIG. 1 with the grab respectively closed and fully open.

The opening and closing mechanism of the grab is shown in detail in FIGS. 1 to 3. A pair of links 33 and 34, one at each side of the grab member 4, are pivotally connected at their opposite ends respectively to a lug on the side wall 21 by a pivot 35 and to the enlargement at the top of the back plate 10 at a pivot 36, the links being pivotally connected to each other at their other ends at a pivot 37. The link 34 pivoted to the back plate 10 is acted upon at a point intermediate its two ends by one end of a further hydraulic ram 39 which at its other end is pivotally mounted on the side of the back plate 10 so that the ram 39 extends alongside the back plate 10.

Since the two links 33 and 34 form a constrained linkage between the pivots 35, 36 and 37 at their ends, extension or retraction of the ram 39 causes the pivot 35 on the side wall 21 and with it the complete grab member 4 to move in an arc about the main pivotal axis 20 of the grab member 4. Owing to the fact that the pivot 20 is located slightly forwards of the back plate 10, the grab member 4 is able to pivot through a full 180°. This is not only an advantage in enabling the grab and bucket loader to be used in its various modes, but it also means that the tines 6 may be made somewhat shorter. With a known silage grab, the pivotal point of the top member is positioned behind the back plate so that the tines have to be longer and the fork and grab members could never be completely closed up.

Figure 7:
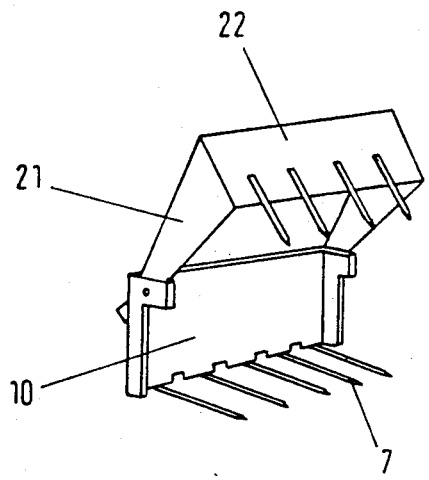
FIG. 7 is a perspective view of the grab as shown in FIG. 6.
Figure 6:
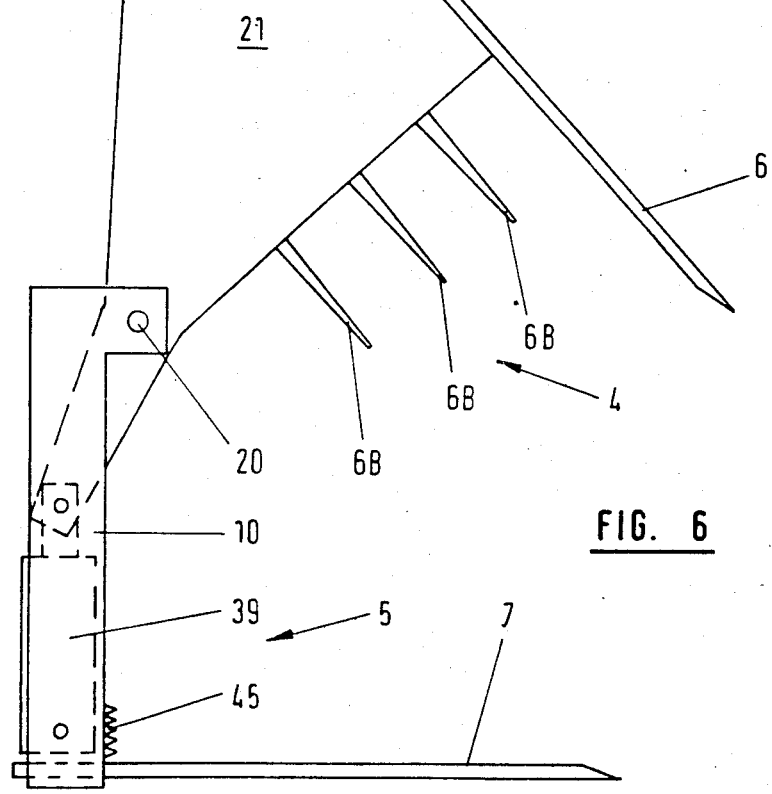

An alternative operating arrangement is shown in FIGS. 5 and 6 in which no mechanical links 33 and 34 are used. Instead, the corners of the side walls 21 of the bucket are provided with extensions 41 projecting beyond the pivot 20, and the hydraulic ram 39 at each side is connected directly to this extension 41 at a pivot 43. Again, extension or retraction of the ram 39 causes the grab member 4 to pivot towards the fork member 5 to close the grab or away from it to open the grab as shown in FIGS. 6 and 7. The pivotal movement in this case will be less than 180° but this is not likely to limit the uses of the bucket/grab greatly. In other respects the grab and scoop of this embodiment is constructed and can be used in the same ways as for the first embodiment.

The various modes of operation are shown in FIGS. 4A to J: side, front and perspective views A, B and I show the grab fully closed for use as a forward operating bucket unit for shifting loose materials such as cow cake, corn, semi-liquids (slurry), soil, gravel, etc. The side, front and perspective views C, D and J show the grab fully open for use as a fork for shifting silage, grass, farmyard manure, etc. Views E and F are side and front views of the unit half-closed for use as a grab for silage, grass, manure, and also timber (tree trunks), steel girders, or hay or straw bales.

Finally, the two side views G and H illustrate how the unit is tilted bodily for discharging a load of material, respectively as a bucket and as a fork or grab.

The bucket or scoop is open at the back as can be seen clearly in FIGS. 4D and 7 but as mentioned above, in other embodiments there may be a solid back panel or an open frame structure. This has the additional advantage of retaining material in the grab and there are other advantages deriving from this.

Thus, if there is a solid back panel to the bucket, the apparatus would be more useful for holding liquids. This is because if the bucket is closed only by the back plate 10 of the other grab member 5, then the entire bucket can only be crowded, i.e. tilted, back by about 20 degrees (using the ram 14 on the tractor loader arms 1) whereas if the bucket component on the grab member 4 has its own back plate extending between the side walls 21, the bucket can be turned almost upside down (by using the ram 39)—see FIG. 3—and therefore if liquids are to be carried the bucket can be crowded at its optimum angle to hold the most liquid.

Figure 8:
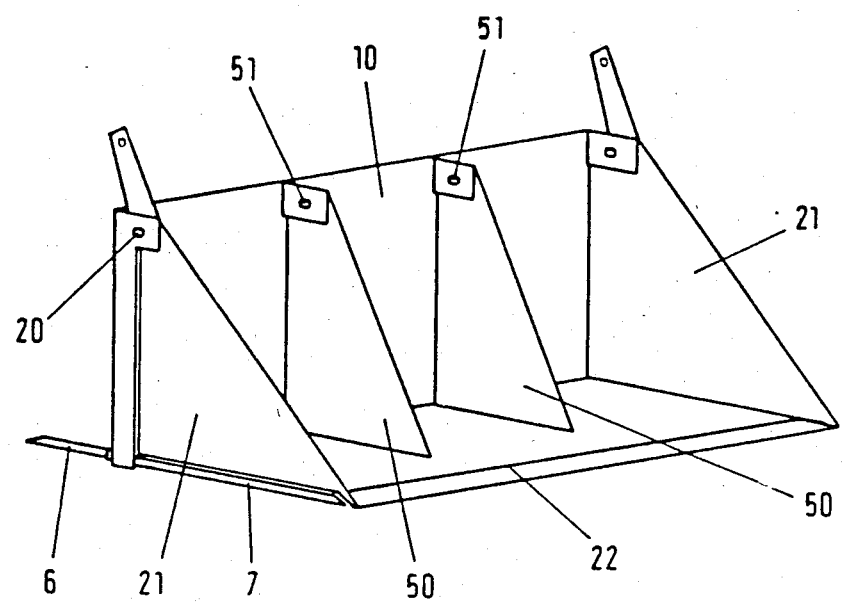
FIG. 8 is a perspective view of a scoop or bucket provided with strengthening gussets.

If the bucket has merely an open frame of, for example bars or struts, at its back, these can advantageously be provided in the form of gussets 50 located in the bucket, as shown in FIG. 8. These gussets 50 are rigidly secured to the bottom panel 22 of the bucket to strengthen it and these prevent it from bending thereby avoiding having to make the bottom wall thick and heavy as would be necessary if the bucket is wide. The gussets 50, (there may for example be two of them equally spaced between the side walls 21) are triangular in shape, similar to the side walls 21 but possibly smaller, or L shaped, and they are hinged from lugs 51 at their upper ends attached to the top of the back plate 10 of the fork member 5. As shown in FIG. 8, which shows the grab unit closed, the hinge points 51 need to be in line with the pivot points 20 of the grab member 4.

It will therefore be appreciated that owing to the invention of providing a scoop or bucket component on one of the grab members the apparatus can be used in many ways for handling a variety of different materials.

Many modifications are possible within the general idea. Thus, the shape of the bucket or scoop can be different from that shown with curved panels, or different flat panel shapes for the side and bottom walls may be used. In the particular embodiments illustrated the height and base dimensions of the triangular side walls are approximately equal but these could be altered to suit particular applications.

The back plate 10, which in the preferred form of the invention forms the back of the bucket, need not be a solid plate but may be an open structure such as bars if the bucket is not needed for moving liquids or semi-liquids.

The tines 7 on the fork member 5 are longer than the tines 6 as shown but whilst preferred this is not essential. There need not be the same number of tines in each set; for example, there could be twelve of the fork tines 7 and only four or five of the grab tines 6. Also, small additional tines 6A as shown in FIG. 5 could be provided on the front bottom of the bucket either as separate elements or as extensions of the tines 6. Optionally, tines could also be provided on the side walls 21 extending beyond the edges 25 towards the fork member 5 as shown in FIG. 6 at 6B.

Where the scoop or bucket is formed by portions on both the fork and grab members, as shown for example in FIGS. 1 to 3, it is not essential for the side and bottom panels to be wholly on the one member and only the back panel on the other. Indeed, many possible combinations of arrangement of the sides, bottom and back panels being partly on one member and partly on the other could be used. Two such further examples are shown in FIGS. 9 to 12.

Figure 9:
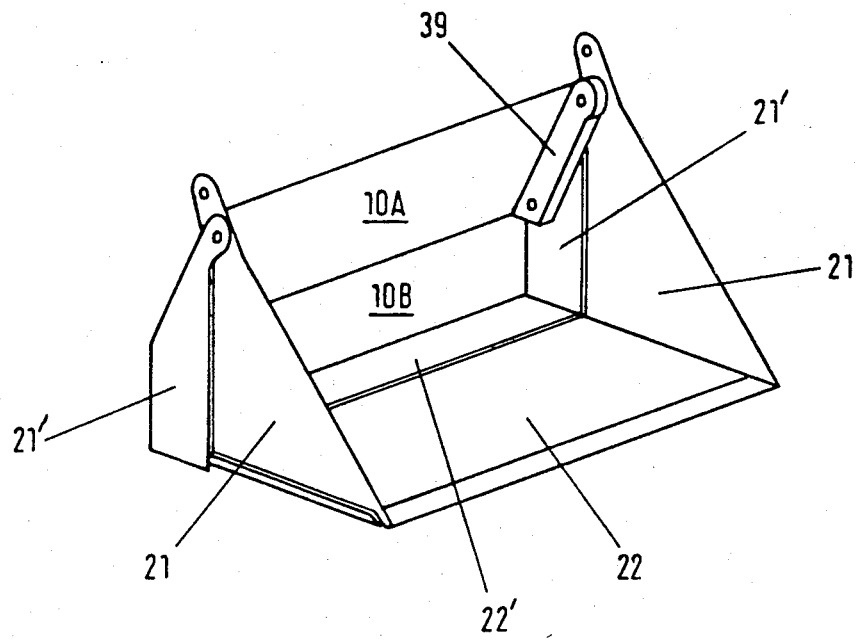
FIGS. 9 to 11 are views of a grab for a tractor in which the scoop is formed by portions on both grab members, FIGS. 9 and 10 showing the grab closed ready for a scooping operation, and FIG. 11 showing the grab open.
Figure 10:
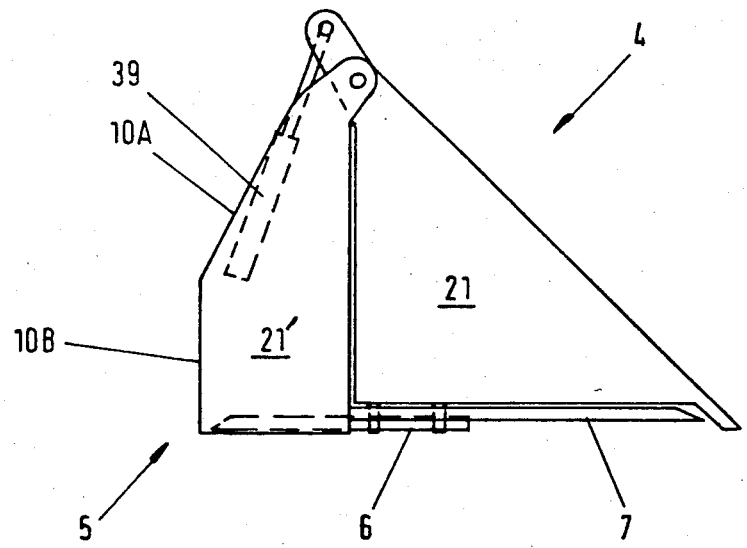
Figure 11:
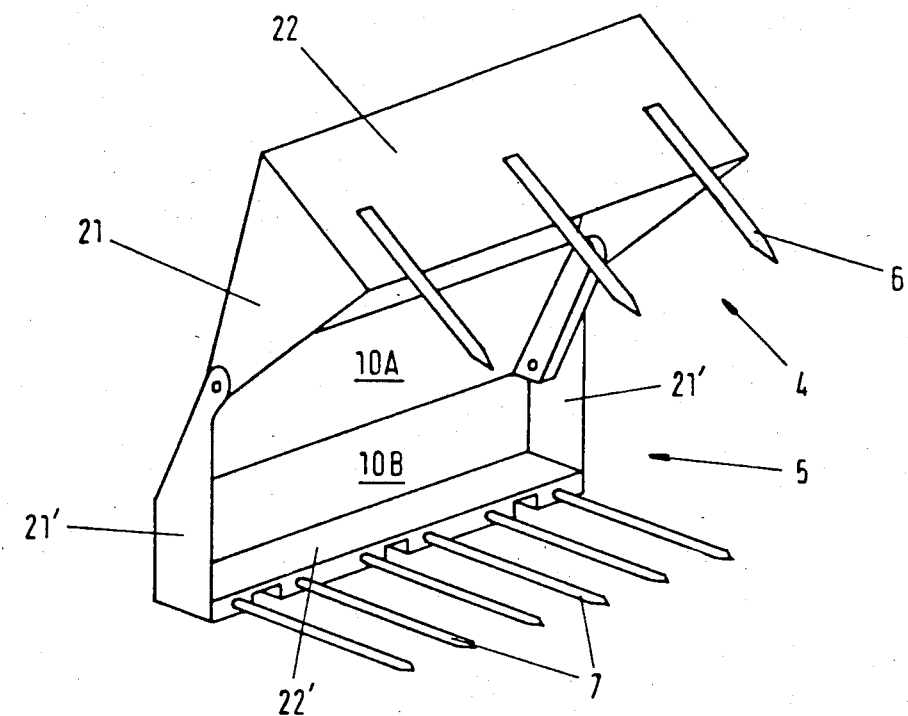

In the embodiment of FIGS. 9 to 11, the pivoting grab member 4 has side panels 21 and a bottom panel 22, whereas the fork member 5 has not only a back panel 10 but also small side panels 21' and a small bottom panel 22', the latter panels aligning and abutting with the side and bottom panels 21 and 22 when the fork and grab members are closed together, to form the complete scoop or bucket in the closed condition of the grab. In this embodiment, it will be seen that the back panel 10 is not planar but has a sloping portion 10A and a smaller, 'vertical', portion 10B.

Figure 12:
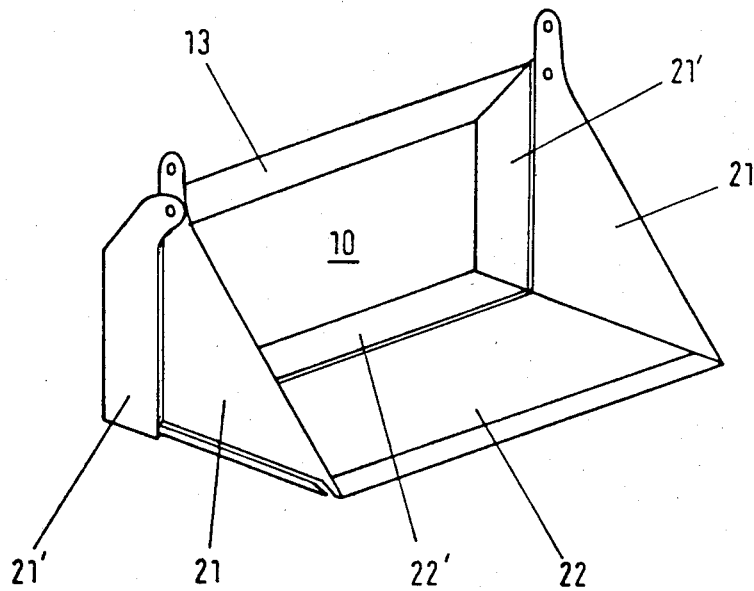
FIG. 12 is a variant on the grab of FIGS. 9 to 11.

The embodiment shown in FIG. 12 is basically similar to that of FIGS. 9 to 11 except that the back panel 10 is planar but there is also a top panel 13, giving a greater capacity to the scoop or bucket.

Whilst the illustrated embodiments show the grab as opening and closing by pivotal movement, it would be possible to have the fork and grab members adapted to open and close by sliding movement of one towards the other.

Although in the embodiments illustrated the grab unit is mounted on the front loader arms of a tractor, it will be appreciated that the grab could be mounted on arms at the side or back of a vehicle or on arms not forming part of a vehicle at all but at a fixed location like derrick arms. The fork and grab members could be provided on robot arms, or mounted on lift arrangements including fork lift trucks. They could also be provided on mobile cranes, mobile tractor loaders, industrial loaders and diggers both single arm or single jointed arms or multiple armed as in the conventional tractor fore loader.

The bucket and grab could be used in advantageous ways not possible with grabs or buckets individually. Thus it could be used to separate fine material or liquids from coarser particles. The machine is first used as a normal bucket to collect the solid-liquid mixture and then the liquid or fine material could be sieved off by partially opening the grab and allowing the liquid or fine material to fall between the tines. The coarse material will be retained by the tines, and can then be deposited elsewhere.

Finally, reference is made to a a further, optional feature illustrated in FIG. 6. This comprises a short toothed edge 45 located near the bottom of the housing of one of the rams 39. This enables the apparatus to be used as a hydraulically-operated vice which would be useful for gripping more firmly short and/or small diameter objects. Such a facility is not possible with known silage loaders because the fork and grab members do not come completely together, as they do in the present invention with the tines inter-meshing.

Short toothed edges 45 may be provided a few cms. apart on each side of the one ram housing, so that the back edge of the bucket side 21 comes in between these two toothed edges in the closed grab position. One or more similar toothed edges may also be provided on the ram housing at the other side of the grab and/or on the back edge(s) of the or each bucket side 21.

I claim:

1. A material handling apparatus for use on a vehicle, said apparatus being capable of acting both as a grab and as a scoop without having additional components fitted or removed, said apparatus comprising a fork member comprising a support structure, a set of tines carried by said support structure so that, in use, the tines project forwardly with respect to said vehicle, and a grab member having a further set of tines projecting therefrom, wherein:
    (a) said grab member is pivotally mounted relative to the fork member so as to permit the fork and grab members to open and close thereby to bring the sets of tines carried thereby toward and away from each other so as to grasp and accommodate material between them when they are at least partially together;
    (b) said tines of the two sets are offset from each other laterally relative to one another so that the fork and grab members can be substantially closed, with the tines of one set fitting between the tines of the other set; and
    (c) at least said grab member is provided with a fixed scoop means such that when the fork and grab members are closed a material scoop is formed, with at least a portion of said scoop means on said grab member overlying at least a portion of said set of tines on the fork member.

2. Apparatus as claimed in claim 1 in which said scoop means is provided wholly on the grab member with the scoop having an opening facing away from the tines on said grab member.

3. Apparatus as claimed in claim 1, in which said scoop means comprises a scoop bottom panel, a scoop back panel, and scoop side panels.

4. Apparatus as claimed in claim 1, in which said scoop means comprises sheet structure portions of both said grab member and fork member, the complete scoop means being operatively formed when the fork and grab members are closed.

5. Apparatus as claimed in claim 4, in which said grab member has scoop side panels and a scoop bottom panel, and said fork member has a scoop back panel, such that when the fork and grab members are closed, the sides and bottom scoop panels on the grab member abut substantially against the back panel of the fork member thereby to operatively form a scoop facing outwardly from the back of the grab member.

6. Apparatus as claimed in claim 4, in which said grab member has scoop side panels and a scoop bottom panel, and said fork member has a scoop back panel with partial side panels and a partial bottom panel, such that when the fork and grab members are fully closed, the sides and botto scoop panels on the grab member substantially abut against the partial side and bottom panels of the fork member thereby to operatively form a complete scoop facing outwardly from the back of the grab member.

7. Apparatus claimed in claim 1, in which said set of tines on each of the fork and grab members is arranged in a straight row, and in which said scoop means on the grab member comprises a bottom scoop panel generally with said set of tines on that member and side scoop panels disposed at each end of the row of tines and arranged generally perpendicularly to said bottom panel.

8. Apparatus as claimed in claim 1, in which said fork and grab members are pivotally interconnected for opening and closing.

* * * * *